(12) United States Patent
Di Lallo et al.

(10) Patent No.: US 12,238,186 B2
(45) Date of Patent: Feb. 25, 2025

(54) WIRELESS TRANSMIT/RECEIVE UNIT (WTRU) DRIVEN EDGE SERVICE DISCOVERY AND SELECTION

(71) Applicant: InterDigital Patent Holdings, Inc., Wilmington, DE (US)

(72) Inventors: Kevin Di Lallo, Laval (CA); Michel Roy, Candiac (CA); Michael Starsinic, Newtown, PA (US); Taimoor Abbas, Sainte-Julie (CA); Zhibi Wang, Woodridge, IL (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/774,009

(22) Filed: Jul. 16, 2024

(65) Prior Publication Data
US 2024/0388643 A1   Nov. 21, 2024

Related U.S. Application Data

(63) Continuation of application No. PCT/US2024/029260, filed on May 14, 2024.
(Continued)

(51) Int. Cl.
*H04L 67/51* (2022.01)
*H04L 67/1061* (2022.01)
*H04L 67/30* (2022.01)

(52) U.S. Cl.
CPC .......... *H04L 67/51* (2022.05); *H04L 67/1063* (2013.01); *H04L 67/30* (2013.01)

(58) Field of Classification Search
None
See application file for complete search history.

(56) References Cited

U.S. PATENT DOCUMENTS 10,181,985 B1 *  1/2019  Passaglia ............... H04L 43/04
2021/0352511 A1 *  11/2021  Lee ....................... H04L 67/125
(Continued)

FOREIGN PATENT DOCUMENTS

WO   WO-2022067829 A1 *  4/2022  .......... G06F 9/5072
WO   WO-2023039409 A1 *  3/2023  ......... H04L 65/4015
(Continued)

OTHER PUBLICATIONS

3rd Generation Partnership Project; "Technical Specification Group Services and System Aspects; Architecture for enabling Edge Applications; (Release 18)", 3GPP TS 23.558 V18.1.0 (3GPP).*
(Continued)

*Primary Examiner* — Lance Leonard Barry
(74) *Attorney, Agent, or Firm* — Flaster Greenberg P.C.

(57) ABSTRACT

A wireless transmit/receive unit (WTRU) may send a discovery request to a first edge enabler server (EES) instance to obtain edge application server (EAS) information. The WTRU may receive a discovery response from the first EES instance. The discovery response may indicate a list of EAS information and/or registrar EES information for one or more EAS instances in the list of EAS information. The WTRU may select an EAS instance based on one or more of the list of EAS information or the registrar EES information for the one or more EAS instances. A second EES instance of the plurality of EES instances may be the registrar EES of the selected EAS instance.

20 Claims, 12 Drawing Sheets

Related U.S. Application Data

(60) Provisional application No. 63/466,372, filed on May 15, 2023.

(56) References Cited

U.S. PATENT DOCUMENTS

2022/0015018 A1* 1/2022 Kim ................. H04W 48/16
2023/0370825 A1* 11/2023 Lee .................. H04W 4/50

FOREIGN PATENT DOCUMENTS

| WO | WO-2023177912 A1 * | 9/2023 | ............. H04L 67/34 |
| WO | WO-2023185710 A1 * | 10/2023 | |
| WO | WO-2023191420 A1 * | 10/2023 | |
| WO | WO-2023211071 A1 * | 11/2023 | |

OTHER PUBLICATIONS

3rd Generation Partnership Project; "Technical Specification Group Services and System Aspects; Architecture for enabling Edge Applications; (Release 18)", 3GPP TS 23.558 V18.1.0, Dec. 2022, 195 pages.

* cited by examiner

WIRELESS TRANSMIT/RECEIVE UNIT (WTRU) DRIVEN EDGE SERVICE DISCOVERY AND SELECTION

CROSS-REFERENCE TO RELATED APPLICATIONS

This application is a continuation of International Patent Application No. PCT/US2024/029260, filed May 14, 2024, which claims the benefit of U.S. Provisional Application No. 63/466,372 filed on May 15, 2023, the entire contents of which is incorporated herein by reference in its entirety.

BACKGROUND

A cellular communication system edge enablement service layer may have cardinality rules that limit Edge Application Server (EAS) registration to a single Edge Enabler Server (EES). For a WTRU to discover available edge services, an EAS discovery request must be sent to the EES where the EAS is registered (e.g., registrar EES). The discovery of a common EAS for a group of Application Clients (ACs) may require the discovery of an EAS (e.g., by communicating with an EES that is not the registrar EES of the EAS). Accordingly, a cellular communication system may be configured to support EAS discovery, e.g., using an EES other than the registrar EES.

Described herein are one or more techniques associated with the use of non-registrar EES for discovery operations.

As a first instance, a WTRU may obtain information about EAS instances available in an Edge Data Network (EDN) by sending EAS discovery requests to each EES instance within the EDN. Additionally, new use cases may require EAS information from a different registrar EES(s) to be provided during edge service discovery or selection. For example, a WTRU may discover and select edge services without connecting to every EES individually in an EDN. An edge enablement service layer of the cellular communication system may be used to enable edge service discovery, e.g., using an EES other than the registrar EES of an EAS that needs to be discovered.

As a second instance, certain edge service discovery procedures may provide EAS information for discovered EAS instances that are registered to the EES handling the request. If, for example, an EES could return EAS information from an EAS registered to another EES instance, the WTRU may not be able to determine the EES where the EAS is registered and cannot indicate an EAS and Application Context Relocation (ACR) scenario selection in the registrar EES. Service continuity procedure failures may occur. Accordingly, an edge enablement service layer of the cellular communication system may be used to enable a WTRU to obtain registrar EES information required to correctly indicate EAS and ACR scenario selection in the EES where the selected EAS is registered. Also, or alternatively, an edge enablement service layer of the cellular communication system may be used to enable an EES to correctly handle service continuity for an EAS registered to another EES.

SUMMARY

A wireless transmit/receive unit (WTRU) may send a discovery request to a first edge enabler server (EES) instance to obtain edge application server (EAS) information. The WTRU may receive a discovery response from the first EES instance. The discovery response may indicate a list of EAS information and/or registrar EES information for one or more EAS instances in the list of EAS information. The WTRU may select an EAS instance based on one or more of the list of EAS information or the registrar EES information for the one or more EAS instances. A second EES instance of the plurality of EES instances may be the registrar EES of the selected EAS instance.

The WTRU may send an EAS information provisioning request to the second EES instance. The EAS information provisioning request may indicate the selected EAS instance and one or more selected application context relocation (ACR) scenarios. The WTRU may receive an information provisioning response from the second EES instance. The WTRU may select the first EES instance of a plurality of EES instances based on an EAS information sharing capability of the first EES instance. The discovery request may include an indication that EAS information is requested from a plurality of EES instances. The discovery request may be sent on a condition that the EAS information sharing capability of the first EES instance indicates that the first EES instance is capable of obtaining EAS information from other EES instances within an edge data network (EDN). The discovery request may indicate a list of one or more other EES instances to obtain EAS information from. The discovery response may indicate one or more ACR scenarios supported by one or more EAS instances in the list of EAS information. The WTRU may receive an EAS information provisioning response that indicates registrar EES information on a condition that one or more of the selected EAS instance or one or more selected ACR scenarios have been rejected.

The WTRU may select one or more ACR scenarios based on one or more of the list of EAS information or the registrar EES information for each discovered EAS instance. The WTRU may obtain a registrar EES profile using the registrar EES information. The registrar EES profile may be obtained from a local cache, from the discovery response, and/or by performing service provisioning procedures with an edge configuration server (ECS). The WTRU may select the one or more selected ACR scenarios according to the EAS information and registrar EES information and profile.

DETAILED DESCRIPTION

Figure 1A:
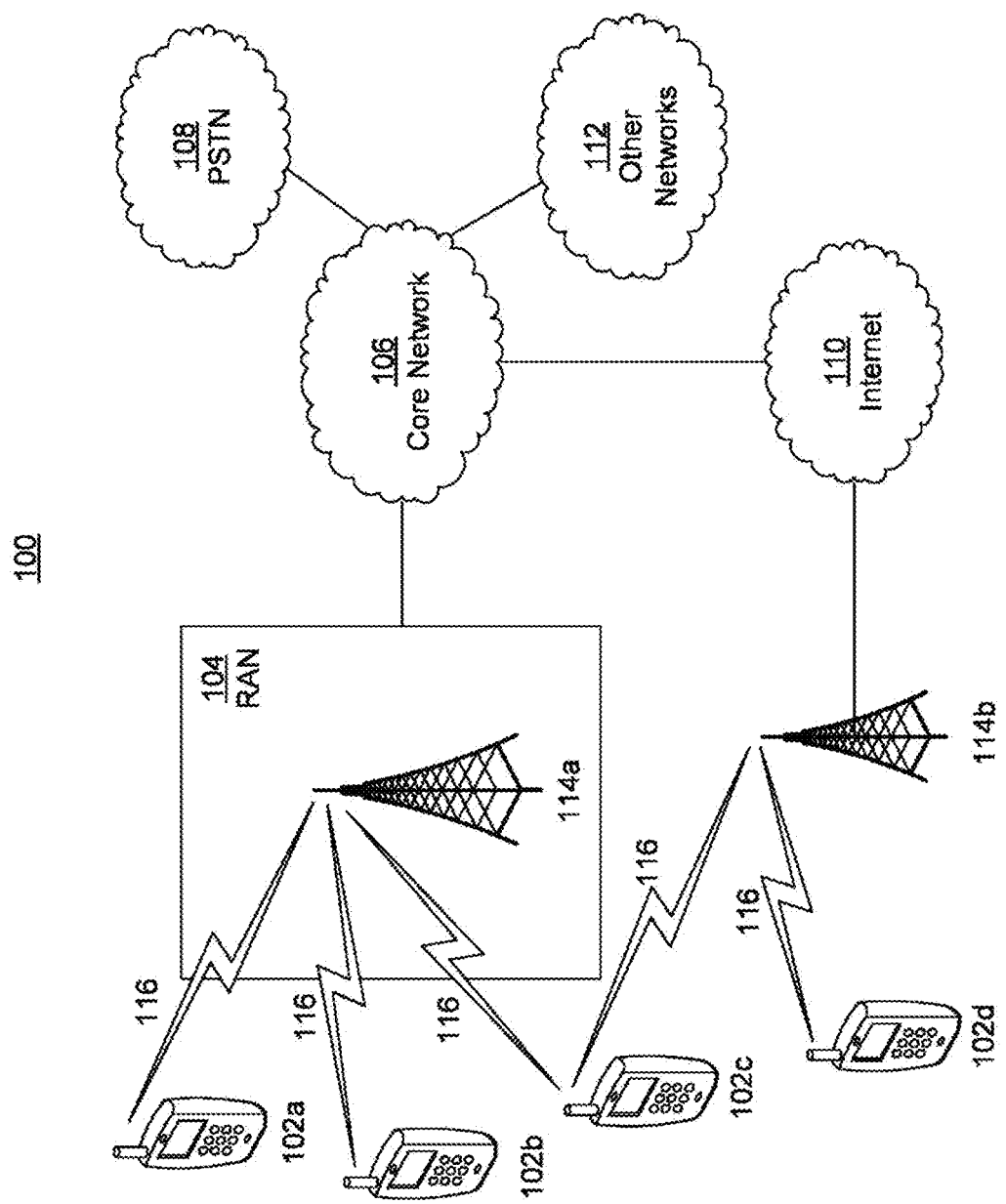
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (WTRU), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
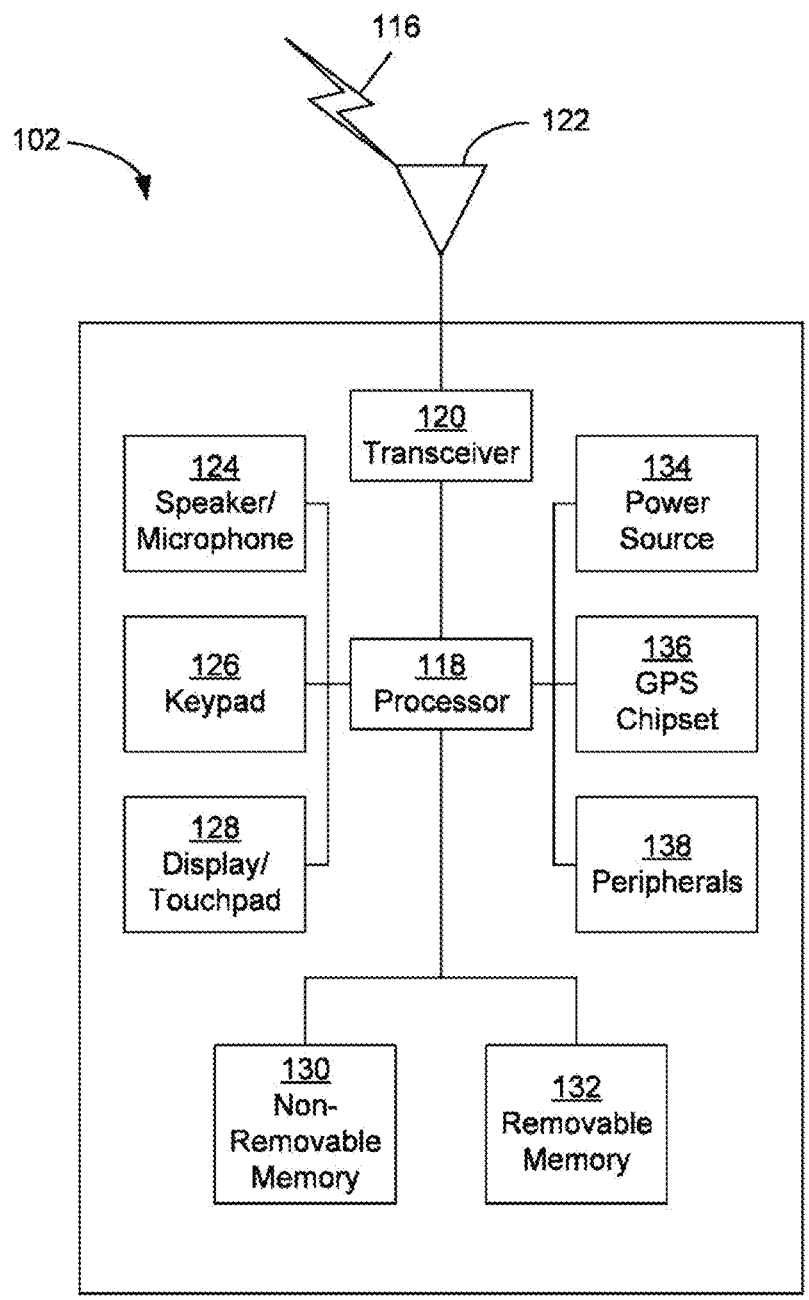
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
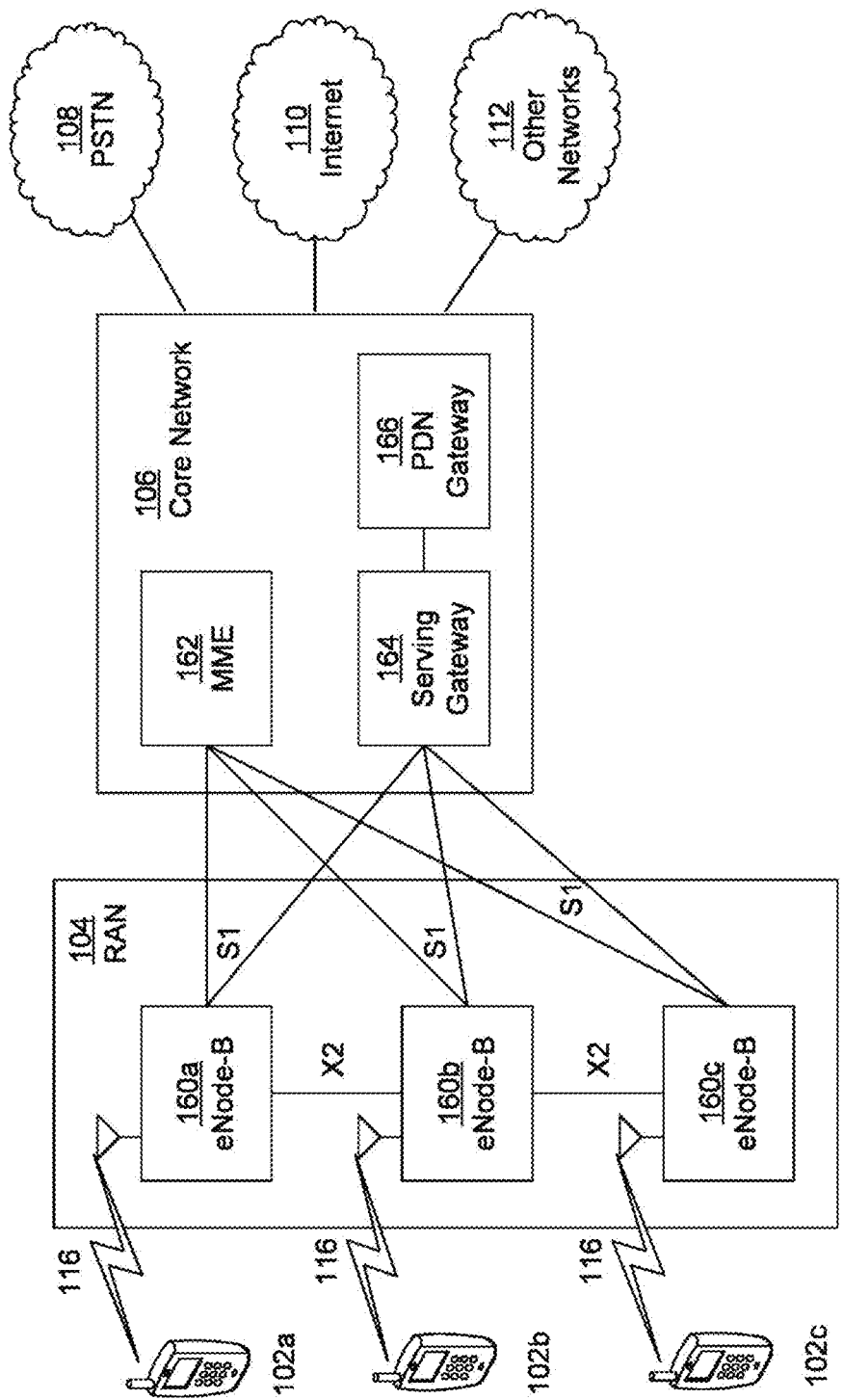
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operation, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example, in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities, including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHZ mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remain idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
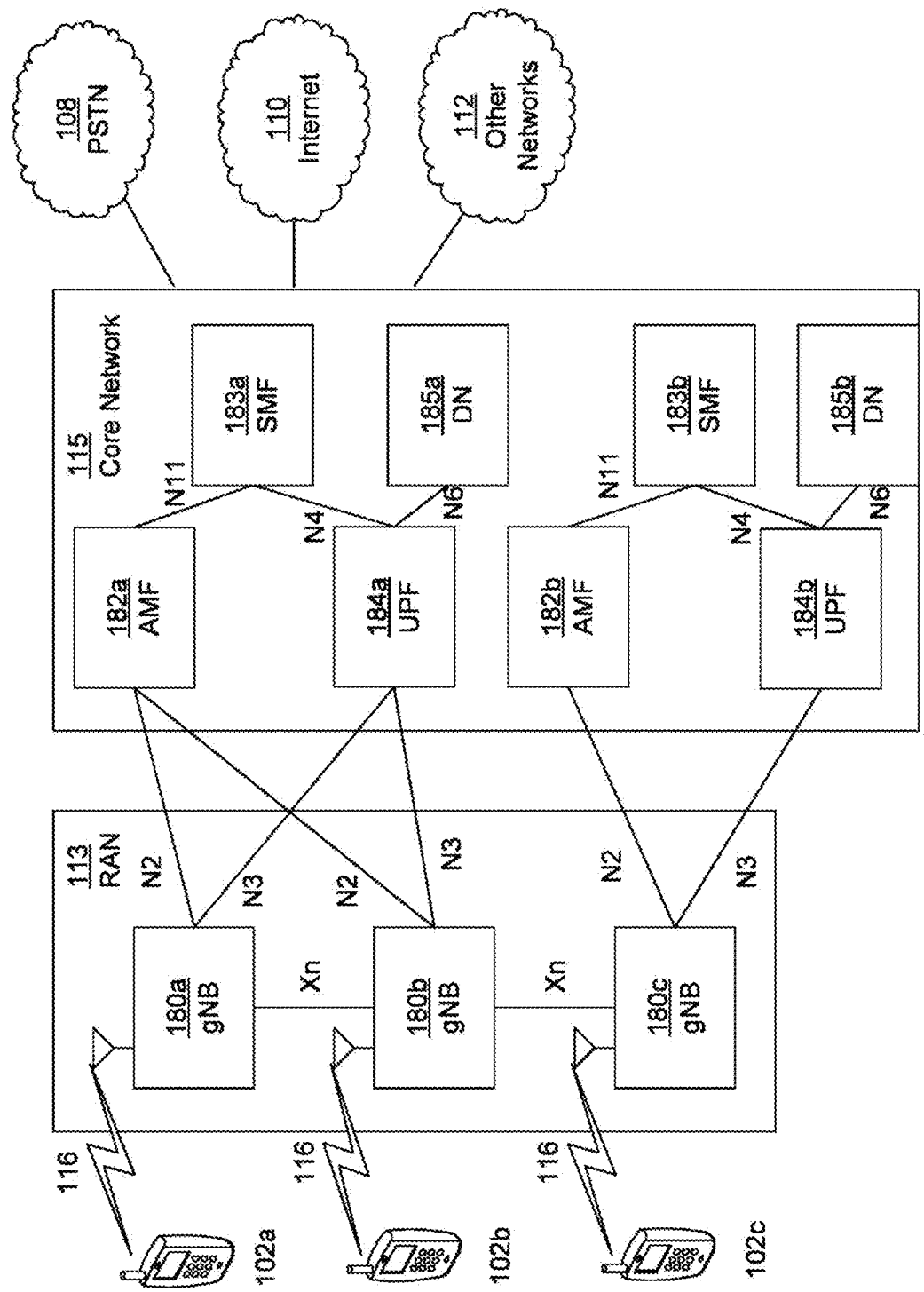
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying numbers of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases, such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP addresses, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The techniques described herein are associated with edge enhancement architectures, and/or may be used to minimize (e.g., prevent) ACR failures. As described herein, a WTRU may discover and select an edge service using an EES that is not the registrar EES. The EES instances deployed within an EDN may share registered EAS information and may provide EAS information and registrar EES information to the WTRU, e.g., during edge service discovery.

Common terminology applicable to the disclosed embodiment is defined. A registrar EES may refer to an EES instance where an EAS instance is registered.

An anchor EES may refer to an EES instance used by an EEC to discover and select edge services within an EDN.

Registrar EES information may refer to information about an EES instance where an EAS is registered. The Registrar EES information may include a unique EES identifier, any information from the EES Profile, or any data specific to the EES instance.

EAS information may refer to information about an EAS instance that has registered to an EES. The EAS information may include a unique EAS identifier, any information from the EAS Profile, or any data specific to the EAS instance.

A repository may refer to a central location where data is stored. An EES may perform the repository function to store and share EAS information and registrar EES information.

A WTRU may request that an EES provide EAS information from one or more EES instances within an EDN. The WTRU may use the discovered EAS information and registrar EES information to select an EAS and to communicate with the registrar EES of the selected EAS for the selection and provisioning of ACR scenarios.

A WTRU may request an EES to perform anchor EES functions. The WTRU may use the discovered EAS information to select an EAS and may select and provision ACR scenarios with the anchor EES. The anchor EES may determine that the selected EAS is registered to a different EES. The anchor EES may use the registrar EES as a proxy to communicate with the selected EAS.

Figure 2:
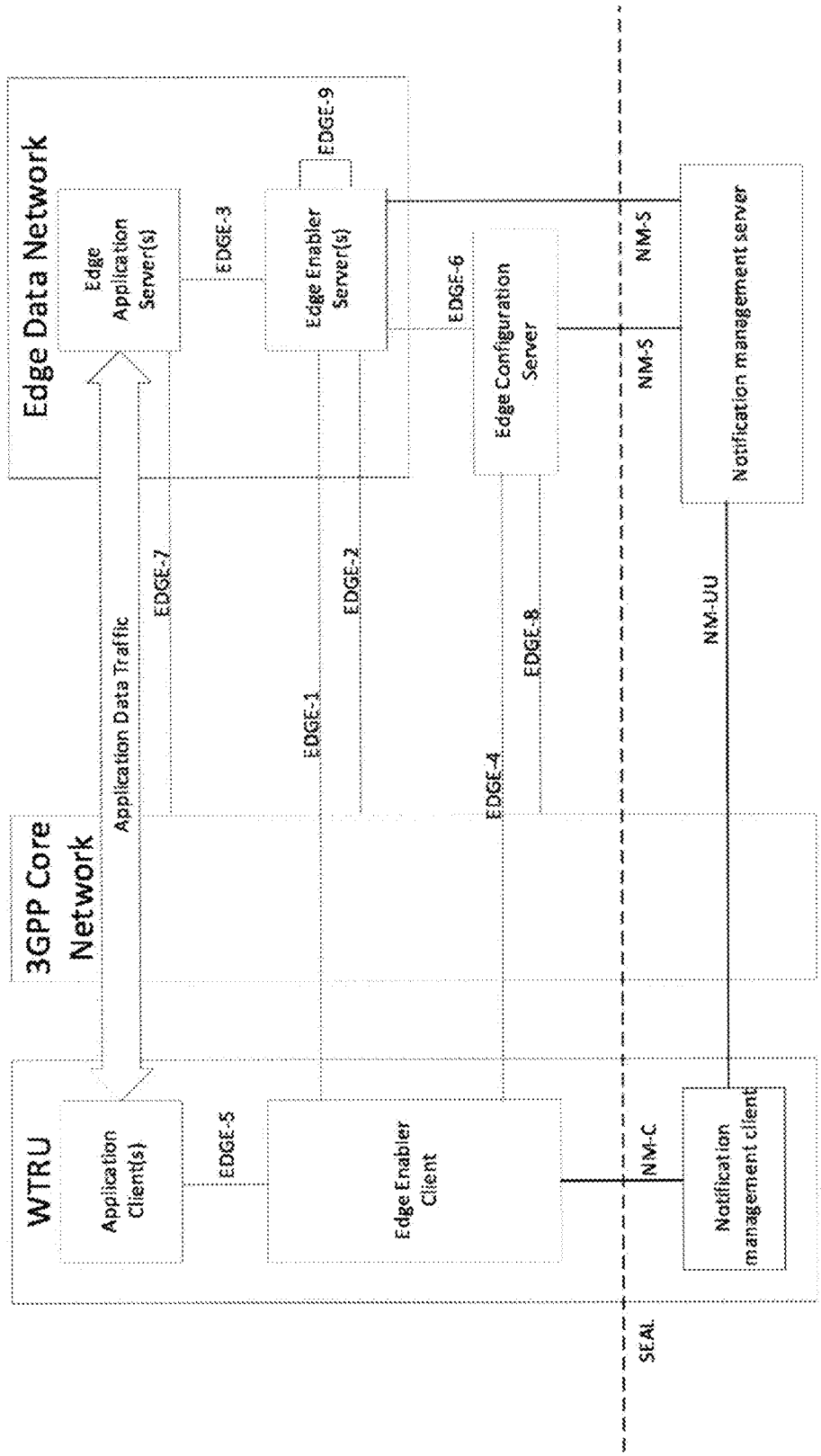
FIG. 2 is a system diagram illustrating an example SA6 architecture for enabling edge applications.

FIG. 2 is a system diagram illustrating an example SA6 architecture 200 for enabling edge applications. As shown in FIG. 2, the components of the SA6 architecture 200 may include at least an Application Client (AC), an Edge Application Server (EAS), an Edge Enabler Client (EEC), an Edge Enabler Server (EES), an Edge Configuration Server (ECS), a Notification Management Client (NMC), and a Notification Management Server (NMS).

The AC may be a user application residing on a WTRU that communicates with an EAS. A WTRU may use several ACs concurrently.

The EAS may be an application server resident in an Edge Data Network (EDN). Typically, it may be a software server executed on generic hardware located at the edge and providing a service to the AC. In the context of a mobility/relocation use case, a Source-EAS (S-EAS) is an instance of an EAS in an initial location and serving the AC before mobility/relocation happens. A Target-EAS (T-EAS) is an instance of an EAS in a destination location and serving the AC after mobility/relocation has happened. There may be multiple EAS instances per EDN. Each EDN may contain a different set of EAS instances of different types (e.g., different EASID). An EAS may serve one or more AC instances that may reside on different WTRUs.

The EEC may provide edge support to the AC instances on the WTRU. There may be one or more EEC per WTRU. Each AC uses only one EEC.

The EES provides supporting functions needed by EAS and EEC. In the context of a mobility/relocation use case, a Source-EES (S-EES) is the EES used before mobility/relocation happens. A Target-EES (T-EES) is the EES used after mobility/relocation has happened. There may be one or more EES instances per EDN (or per Data Network Name (DNN)). There may be multiple EDN instances in the network.

The ECS may provide supporting functions for an EEC or EES to discover EES instances providing a certain EAS. There may be one or more ECSs for the network.

The NMC may provide supporting functions for an EEC to create a notification channel between the NMC and the NMS to receive notifications from the ECS or EES. Each EEC uses only one NMC.

The NMS may provide supporting functions for an ECS or EES to send notifications to an EEC via a notification channel created between the NMC and the NMS. There may be one or more NMSs for the network.

The service continuity procedures for transferring an application context from an S-EAS to a T-EAS may be defined in the Edge Enablement Layer (EEL). For example, the context transfer may be triggered, for example, by WTRU movement and/or non-mobility events such as EAS server maintenance, overload, etc. Service continuity may be used to minimize edge service interruption to the ACs executing on the WTRU.

Figure 3:
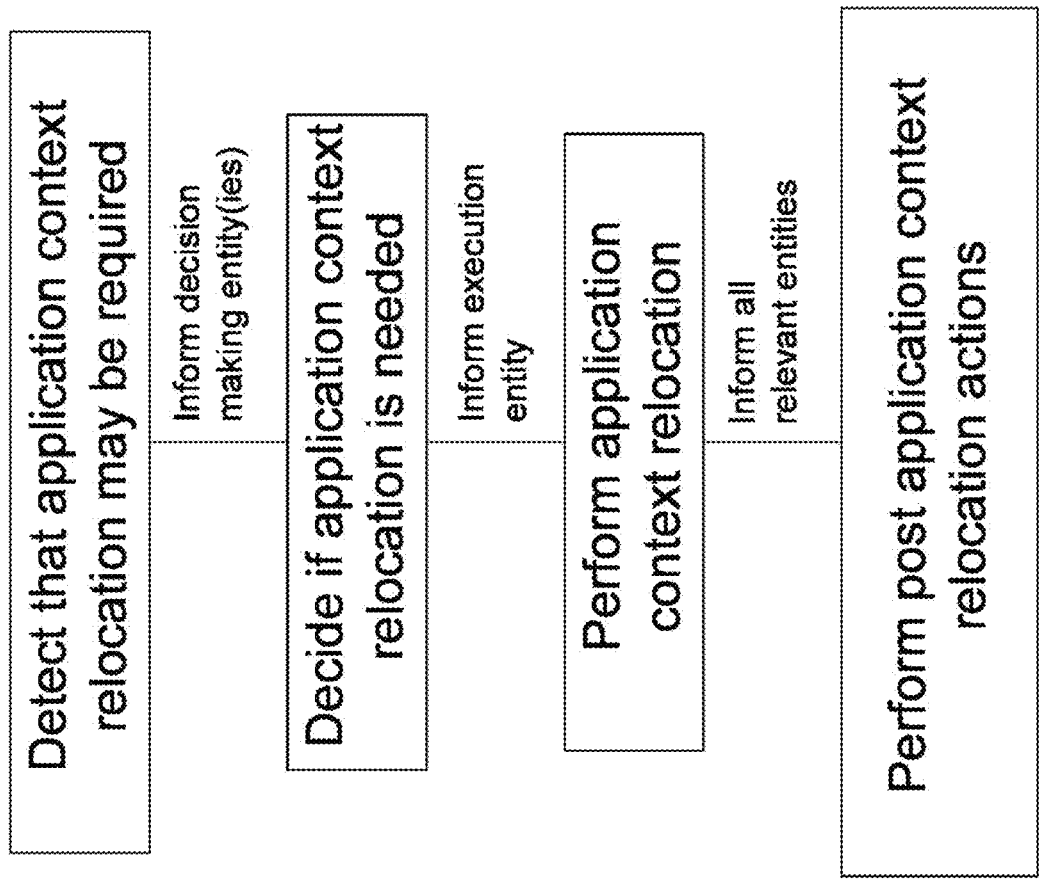
FIG. 3 is a flow diagram illustrating a high-level overview of an Application Context Relocation (ACR).

FIG. 3 is a flow diagram illustrating a high-level overview of an Application Context Relocation (ACR) 300. Service continuity for applications requiring context relocation may be specified by the EEL in five different application context relocation (ACR) scenarios. Each scenario may be composed of one or more (e.g., 4) different phases including detection, decision, execution, and post-execution. ACR scenarios may specify different EEL entities (e.g., EEC, EES, EAS) for the detection and decision phases (e.g., a detection entity and a decision-making entity). Different sets of interactions between EEL entities may be defined for the execution phase.

The detection entity may monitor WTRU location and movement and may inform the decision-making entity. The decision-making entity then determines if an ACR is required and commands the execution entity to perform ACR. The execution entity then runs the ACR procedures defined in the service continuity scenarios to transfer the application context from the S-EAS to the T-EAS. When ACR execution is complete, ACR cleanup is performed.

EAS information sharing capabilities and configurations are disclosed herein. Sharing of EAS information between EES instances within an EDN requires EAS information sharing participants to provide EAS information sharing capabilities. This may allow for the determination of the EAS information sharing configuration that should be applied. EAS information sharing participants are EESs.

EAS information sharing capabilities may include an indication that the EES is capable of supporting EAS information sharing, a list of supported sharing methods, an indication that the EES can be a repository for EAS information, a notification URL to receive EAS information sharing configuration updates, and an EAS information sharing configuration.

EAS information sharing configuration may include a selected sharing method, one or more repository addresses (e.g., IP address, URI, FQDN), and endpoints, and a list of EES instances to share registered EAS information with.

In a centralized EAS information sharing configuration, when supported, EES instances deployed within an EDN may share registered EAS information. A centralized approach may be used to share EAS information between EES instances. A repository function may be added to one or more EES such that during EES registration, registrar EES instances may receive information about the EES repository to use for sharing EAS information. EES instances may publish EAS information to the EES repository and obtain updated EAS information from the EES repository. If multiple EES repositories are configured in an EDN, they may synchronize data to provide consistent EAS information.

Figure 4:
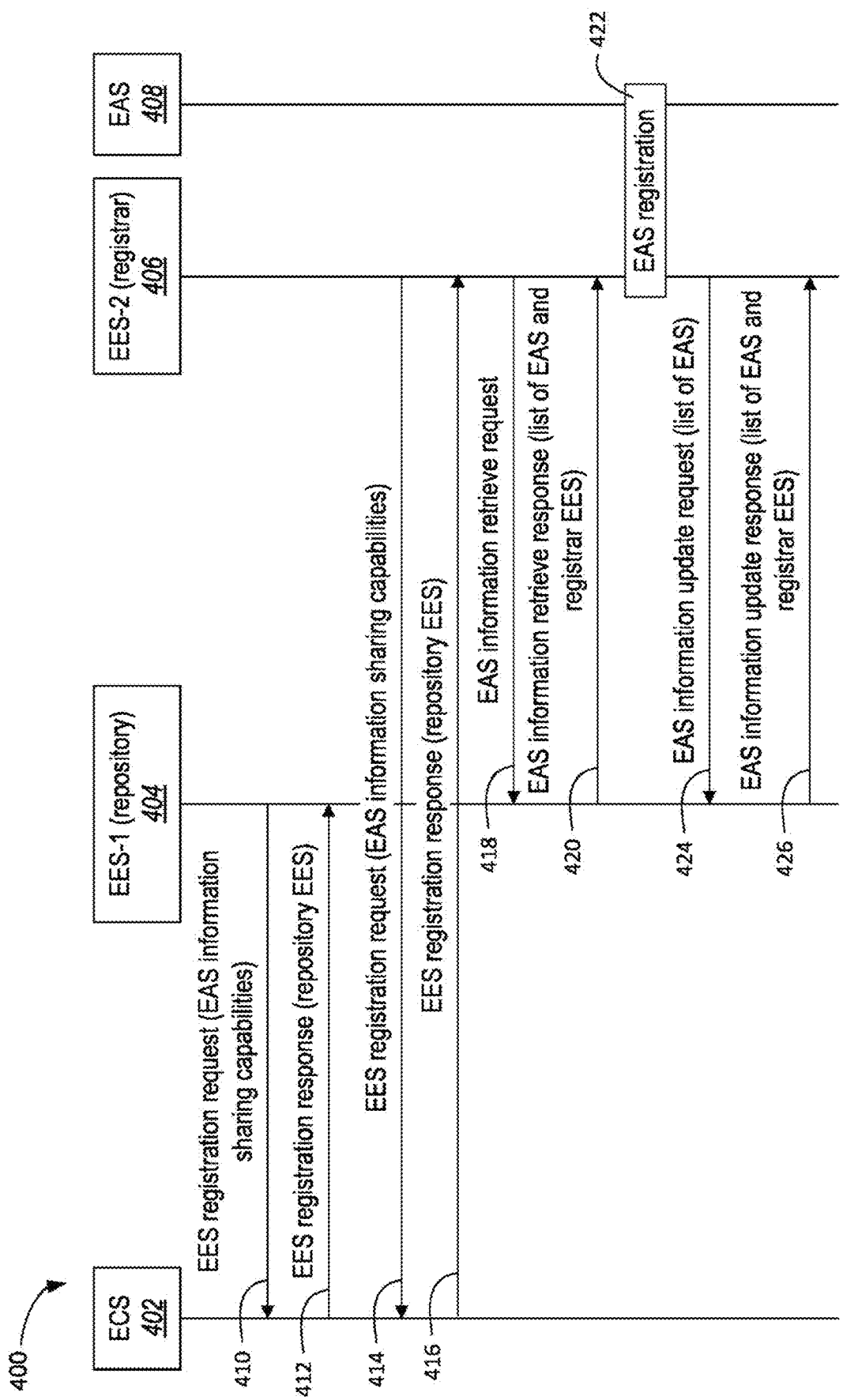
FIG. 4 is a flow diagram illustrating edge application server (EAS) information sharing using an edge enabler server (EES) repository.

FIG. 4 is a flow diagram illustrating EAS information sharing 400 using an EES repository according to an embodiment. As shown in FIG. 4, EES-1 404 may perform the repository function, e.g., to support EAS information sharing.

At 410, EES-1 404 may send an EES registration request to the ECS 402. The EES registration request may include EAS information sharing capabilities. For example, EES-1 404 may indicate that it supports centralized EAS information sharing and/or may provide an indication that it can be an EAS information repository for the EDN.

At 412, the ECS 402 may send an EES registration response to the EES-1 404. The EES registration response may include EAS information sharing configuration to be applied at the EES. The ECS 402 may use the EAS information sharing capabilities of the registering and registered EES instances to determine which EAS information sharing configuration to return. The ECS 402 may determine that one or more EES repositories are available and may decide to configure one or more EES repositories in the EAS information sharing configuration. When multiple EES repositories are configured within an EDN, the EES repositories may synchronize data to ensure data consistency within the EDN.

For example, the ECS 402 may determine that EES-1 404 is the only EES in the EDN and that EES-1 404 supports the repository function. The ECS 402 may select EES-1 404 to be the EAS information repository for the EDN and may include the EES-1 repository connectivity information in the EAS information sharing configuration. Alternatively, the ECS 402 may determine that multiple EES instances support the repository function and may select multiple EES instances to be the EAS information repository.

At 414, EES-2 406 may send an EES registration request to the ECS 402. The EES registration request may include EAS information sharing capabilities. For example, EES-2 406 may indicate that it supports centralized EAS information sharing.

At 416, the ECS 402 may send an EES registration response to EES-2 406. The EES registration response may include the EAS information sharing configuration that is to be applied at the EES. The ECS 402 may use the EAS information sharing capabilities of the registering and registered EES instances to determine the EAS information sharing configuration.

For example, the ECS 402 may indicate that a repository should be used for EAS information sharing and may include the EES-1 repository connectivity information in the EAS information sharing configuration.

At 418, the EES-2 406 may send an EAS information retrieve request to the provisioned EES-1 repository (e.g., EES-1 404) to obtain the latest EAS information. The EAS information retrieve request may be triggered by the EES-2 406 receiving EES-1 repository connectivity information.

Although not shown in FIG. 4, EES-2 406 may, for example, subscribe for notifications from the EES-1 repository (e.g., EES-1 404) when EAS information is updated in the repository. The subscribe operation may be triggered by EES-2 receiving EES-1 repository connectivity information.

At 420, the EES-1 repository (e.g., EES-1 404) may send an EAS information retrieve response to the EES-2 406. The EAS information retrieve response may include a list of EAS information and registrar EES information for each EAS instance.

For example, if the repository includes EAS information about EAS instances registered to EES-1 404, the EAS information retrieve response may include the EAS profiles of the registered EAS instances and the EES Profile of EES-1 404.

At 422, an EAS 408 may perform EAS registration procedures with the EES-2 406.

At 424, EES-2 406 may send an EAS information update request to the provisioned EES-1 repository (e.g., EES-1 404). The EAS information update request may include a list of EAS information for the EAS instances registered to EES-2 406 and may include registrar EES information for EES-2 406.

At 426, the EES-1 repository (e.g., EES-1 404) may send an EAS information update response to EES-2 406. The EAS information update response may include a list of EAS information and registrar EES information for each EAS instance.

For example, if the repository contains updated EAS information from any of the EES instances in the EDN, the EES-1 repository (e.g., EES-1 404) may include the updated EAS information and registrar EES information in the EAS information update response.

Although not shown in FIG. 4, the EES-1 repository (e.g., EES-1 404) may notify subscribed EES instances from the same EDN about the changes to the EAS information repository.

In a distributed EAS information sharing configuration, when supported, EES instances deployed within an EDN may share registered EAS information. A distributed approach may be used to share EAS information between EES instances. EES instances obtain a list of EES within the same EDN and publish EAS information updates to one or more EES from this list.

Figure 5:
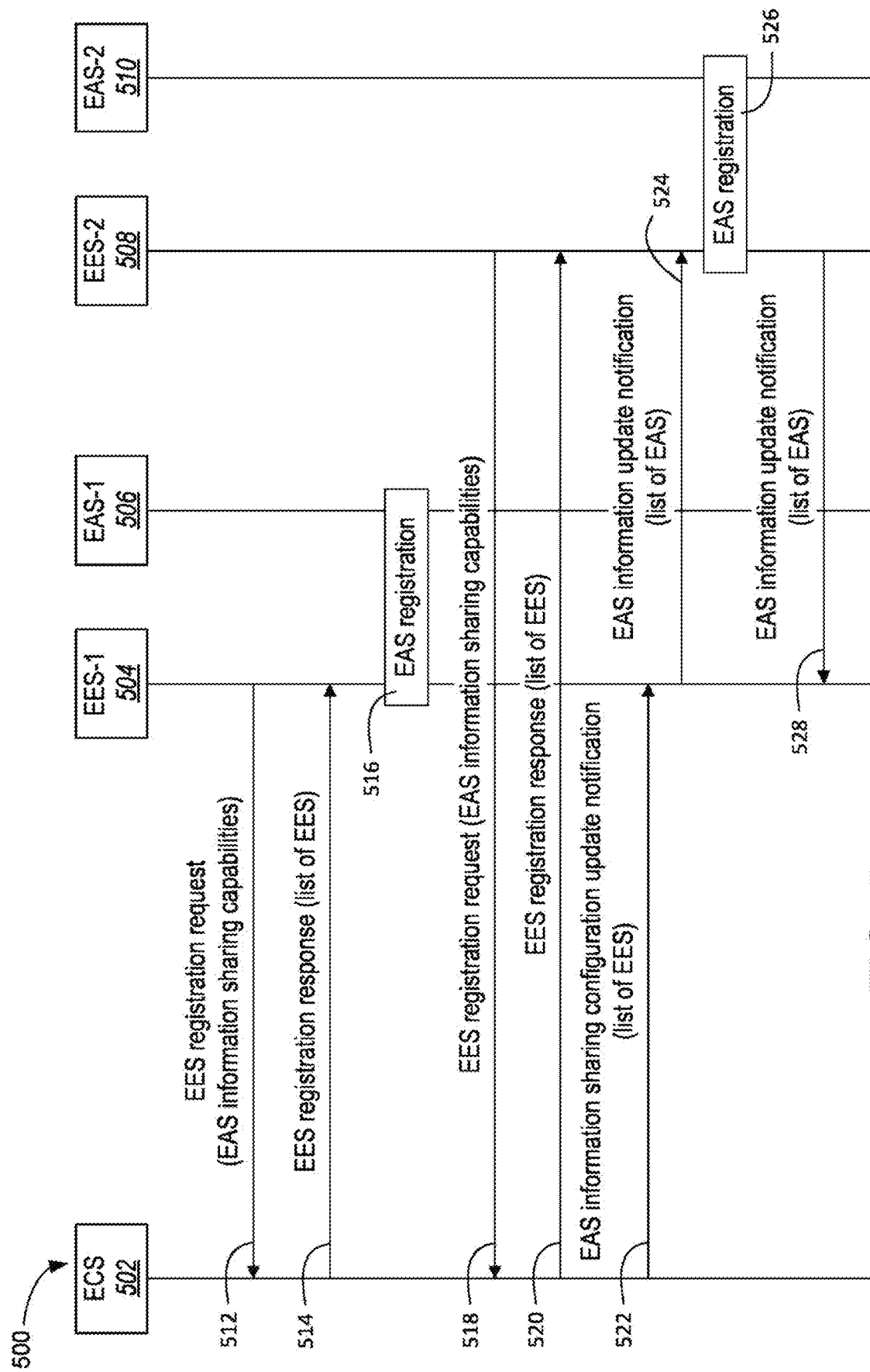
FIG. 5 is a flow diagram illustrating an example associated with distributed EAS information sharing.

FIG. 5 is a flow diagram illustrating an example associated with distributed EAS information sharing 500. At 512, EES-1 504 may send an EES registration request to the ECS 502. The EES registration request may include EAS information sharing capabilities.

For example, EES-1 504 may indicate that it supports distributed EAS information sharing and may provide a URL and endpoint to receive EAS information updates.

At 514, the ECS 502 may send an EES registration response to EES-1 504. The EES registration response may include EAS information sharing configuration to be applied at the EES. The ECS 502 may use the EAS information sharing capabilities of the registering and registered EES instances to determine the EAS information sharing configuration to return.

For example, the ECS 502 may determine that distributed EAS information sharing should be used and may add EES-1 504 to the list of EES instances that should share EAS information within the EDN.

At 516, an EAS (e.g., such as EAS-1 506) may perform EAS registration procedures with EES-1 504. EES-1 504 may use the provisioned EAS information sharing configuration to determine if an EAS information update is required.

For example, EES-1 504 may be the only EES instance in the EDN in the configured EAS information sharing list and may not need to send EAS information to other EES instances.

At 518, EES-2 508 may send an EES registration request to the ECS 502. The EES registration request may include EAS information sharing capabilities.

For example, EES-2 508 may indicate that it supports distributed EAS information sharing and may provide a URL and endpoint to receive EAS information updates.

At 520, the ECS 502 may send an EES registration response to EES-2 508. The EES registration response may include an EAS information sharing configuration to be applied at the EES (e.g., EES-2 508). The ECS 502 may use the EAS information sharing capabilities of the registering and registered EES instances to determine the EAS information sharing configuration.

For example, the ECS 502 may indicate that distributed EAS information sharing should be used and may add EES-2 508 to the list of EES instances that should share EAS information within the EDN.

Although not shown in FIG. 5, the registered EES may, for example, use the provisioned EAS information sharing configuration to determine if an EAS information update is required.

For example, EES-2 508 may see that EES-1 504 is on the list of EES instances to share EAS information with. However, EES-2 508 may not have any registered EAS instance information to share and may not need to send an EAS information update.

At 522, the ECS 502 may send an EAS information sharing configuration update notification to EES-1 504. The EAS information sharing configuration update notification may include an updated EAS information sharing configuration to be applied at EES-1 504.

For example, the ECS 502 may notify EES-1 504 that EES-2 508 is now available for EAS information sharing.

At 524, the EES-1 504 may send an EAS information update notification to EES-2 508. The EAS information update notification may include a list of EAS information for EAS instances registered with the EES-1 504.

At 526, an EAS (e.g., EAS-2 510) may perform EAS registration procedures with EES-2 508. EES-2 508 may use the provisioned EAS information sharing configuration to determine if an EAS information update is required.

For example, EES-2 508 may determine that the new EAS instance information should be provided to EES-1 504.

EES-2 508 may send an EAS information update notification to EES-1 504. The EAS information update notification may include a list of EAS information for EAS instances registered with EES-2 508.

A solution solves the problem that a WTRU is unable to discover edge services that are registered to EES instances other than the one handling the request. The solution also solves the problem that when a WTRU is allowed to discover edge services registered to other EES instances, the WTRU is unable to determine which EES instance the discovered EAS instances are registered to. The WTRU may be unable to indicate the selected EAS and ACR scenarios to the EES where the selected EAS is registered, which may cause service continuity procedures to fail. This solution enables a WTRU to obtain the registrar EES information required to indicate EAS and ACR scenario information in the EES where the selected EAS is registered.

A WTRU may perform the following actions for discovering and selecting edge services within an EDN. The WTRU may send a service provisioning request to an ECS. The WTRU may receive a service provisioning response from the ECS; wherein the service provisioning response may include EDN configuration information; wherein the EDN configuration information may include a list of EES instances and EAS information sharing capability of the EAS instances; wherein EAS information sharing capability may indicate that the EES is capable of supporting EAS information sharing. The WTRU may select an EES instance according to the EAS information sharing capability of the EES. On the condition that the EAS information sharing capability of the EES indicates that the EES is capable of obtaining EAS information from other EES instances within an EDN, the WTRU may send an EAS discovery request to a selected EES; wherein the EAS discovery request may include a list of one or more other EES instances to obtain EAS information from or may include an indication that EAS information may be obtained from other EES instances in the EDN and may receive an EAS discovery response from the selected EES; wherein the EAS discovery response may include a list of EAS instance information and may include information of a registrar EES for each discovered EAS instance; wherein a registrar EES is the EES instance where an EAS is registered; wherein registrar EES information may include a unique EES identifier, an EES Profile, and any information specific to the registrar EES instance, and select an EAS instance according to the EAS instance information and/or registrar EES information. On the condition that the registrar EES of the selected EAS instance is different than the selected EES instance from the EAS discovery response, the WTRU may obtain the registrar EES profile using the registrar EES information; wherein the registrar EES profile may be obtained from a local cache, from the EAS discovery response or by performing service provisioning procedures with the ECS and may select ACR scenario(s) according to the EAS instance information and registrar EES information and profile. The WTRU may send an EAS information provisioning request to the registrar EES; wherein the EAS information provisioning request may include the selected EAS and ACR scenario(s). The WTRU may receive an EAS information provisioning response from the registrar EES; wherein the EAS information provisioning response may include an indication that the selected EAS and ACR scenarios have been accepted or rejected; wherein a rejection indication may include EAS instance information and registrar EES information for a different EAS instance; wherein the returned EAS instance may be required or preferred by the EES. On the condition that the registrar EES of the EAS instance returned in the EAS provisioning response is different than the EES instance that sent the EAS provisioning response, the WTRU may send an EAS information provisioning request to the registrar EES of the EAS instance returned in the EAS provisioning response and may receive an EAS information provisioning response from the registrar EES; wherein the EAS information provisioning response may include an indication that the selected EAS and ACR scenarios have been accepted.

One or more techniques associated with edge service discovery and selection with registrar EES information are disclosed herein. A WTRU may determine to discover edge services within an EDN without having to query each EES in the EDN. When supported by the EES, a WTRU may send a discovery request to one EES in the EDN, for example, to obtain EAS information and registrar EES information from one or more EES instances within the EDN. The WTRU may use the discovered EAS information and registrar EES information to select an EAS and to communicate with the registrar EES of the selected EAS for the selection and provisioning of ACR scenarios.

Figure 6:
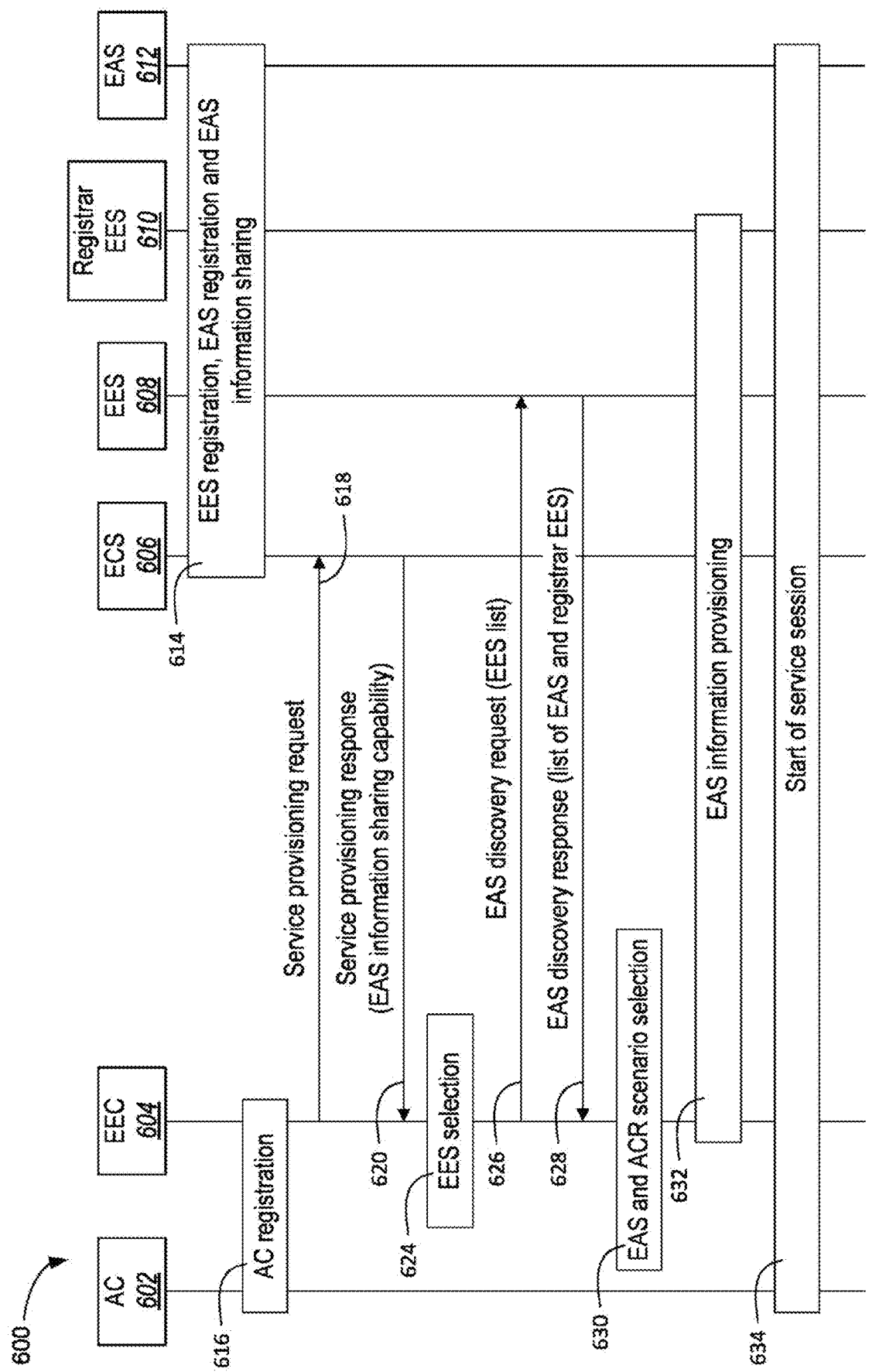
FIG. 6 is a flow diagram illustrating an example associated with edge service discovery and selection with registrar EES information.

FIG. 6 is a flow diagram illustrating an example associated with edge service discovery and selection 600 with registrar EES information. At 614, EES instances (e.g., EES 608, Registrar EES 610) within an EDN may register with an ECS 606. EAS instances (e.g., EAS 612) within an EDN may register with an EES (e.g., Registrar EES 610). The EES 608 may receive EAS information from EAS information update notifications sent by other EESs (e.g., Registrar EES 610).

EES registration requests may include EAS information sharing capabilities of the EES instances. The ECS 606 may use the EAS information sharing capabilities to determine an EAS information sharing configuration for each EES instance. An EAS (e.g., EAS 612) may register to one of the EES instances (e.g., the registrar EES 610). The registrar EES 610 may share the registered EAS information with other EES instances within the same EDN.

Also, or alternatively, the AC 602 may register, at 616, with the EEC 604 and may request edge services.

At 618, the EEC 604 may send a service provisioning request to the ECS 606.

At 620, the ECS 606 may send a service provisioning response to the EEC 604. The service provisioning response may include the EAS information sharing capability of the EES instances.

For example, EAS information capabilities may inform the EEC 604 about which EES instances may be used to obtain EAS information from all EES instances within an EDN.

At 624, the EEC 604 may select an EES to use for edge service discovery. The EEC 604 may consider the EAS information sharing capability of the EES instances while making a selection.

For example, the EEC 604 may prefer to select an EES instance from an EDN where EAS information sharing is supported.

At 626, the EEC 604 may send a discovery request (e.g., an EAS discovery request) to the selected EES (e.g., EES 608), for example, to obtain EAS information and registrar EES information for a plurality of EES instances. The discovery request may include a list of one or more EES instances from which EAS information is requested or may include an indication that EAS information is requested from the plurality of (e.g., all) EES instances within the EDN. The discovery request may include an indication that EAS information is requested from the plurality of EES instances. The EEC 604 may send, at 626, the discovery request on a condition that the EAS information sharing capability of the selected EES (e.g., EES 608) indicates that the selected EES (e.g., EES 608) is capable of obtaining EAS information from other EES instances within the EDN.

The EES 608 may determine EAS information and registrar EES information for EAS instances registered to other EES instances. For example, the EES 608 may determine the EAS information and the registrar EES information based on an EAS information sharing configuration associated with the EES 608. The EAS information sharing configuration associated with the EES 608 may include a selected sharing method, one or more repository addresses, one or more repository endpoints, and/or a list of EES instances with which to share the EAS information. Upon receiving a discovery request (e.g., an EAS discovery request), the EES 608 may obtain the EAS information and registrar EES information for the requested EES instances. The EES 608 may obtain the EAS information and registrar EES information from a local cache of EAS information sharing results or by sending an EAS information retrieve request to the EES repository. The EES 608 may store the EAS information and the registrar EES information for the EAS instances registered to other EES instances. The registrar EES information may include a unique EES identifier, an EES profile, and/or other information specific to the registrar EES instance.

At 628, the selected EES (e.g., EES 608) may send a discovery response (e.g., an EAS discovery response) to the EEC 604. The discovery response may include a list of EAS information (e.g., EAS instance information) and may include registrar EES information for one or more EAS instances (e.g., when the registrar EES 610 differs from the selected EES 608). The discovery response may indicate one or more ACR scenarios supported by one or more EAS instances in the list of EAS information.

For example, if the EES 608 handling the EAS discovery request has no registered EAS instances but has received EAS instance information from another EES instance, the EES 608 handling the request may provide the EAS Profile of the EAS instance, as well as its registrar EES information, in the EAS discovery response.

At 630, the EEC 604 may select an EAS instance (e.g., EAS 612) and/or ACR scenario(s) for provisioning. The EEC 604 may consider the EAS information and registrar EES information from each discovered EAS while making a selection. This information will allow the EEC 604 to make a better-informed selection within an EDN. For example, the EEC 604 may select, at 630, the EAS instance based on the list of EAS information and/or the registrar information for the one or more EAS instances. The EEC 604 may select, at 630, an EAS instance that has a registrar EES 610 that is different than the EES instance (e.g., EES 608) selected, at 624. The EEC 604 may select, at 630, one or more ACR scenarios based on one or more of the list of EAS information or the registrar EES information for each discovered EAS instance. For example, the EEC 604 may select, at 630, the one or more ACR scenarios according to the EAS information, the registrar EES information, and/or the registrar EES profile.

For example, with a single EAS discovery procedure, the EEC 604 may have obtained EAS information of all EAS instances within an EDN and the EEC 604 may compare Key Performance Indicators (KPIs) or service continuity capabilities from all EAS and registrar EES instances while making an EAS and ACR scenario(s) selection, at 630.

If the selected EAS instance is registered to the EES 608 used for edge service discovery, then EAS and ACR scenario(s) selection may continue using existing procedures. If the selected EAS instance is registered to a different EES, then the EEC 604 may use the registrar EES information to determine where the service provisioning request should be sent.

Although not shown in FIG. 6, the EEC 604 may need to obtain the registrar EES profile from locally cached service provisioning results, or the EEC 604 may need to run service provisioning procedures again. For example, the EEC 604 may obtain the registrar EES profile using the registrar EES information. The registrar EES profile may be obtained from a local cache, from the discovery response, or by performing edge service provisioning procedures with the ECS 606. Edge service provisioning procedures may include EAS information provisioning as described herein. ACR scenario selection may need re-evaluation using the registrar EES service continuity capabilities. Finally, the EEC 604 may need to register with the selected registrar EES (e.g., Registrar EES 610) if the registrar EES 610 requires EEC registration.

At 632, the EEC 604 may perform one or more edge service provisioning procedures (e.g., such as EAS information provisioning) with the registrar EES 610 of the selected EAS instance (e.g., EAS 612). For example, the EEC 604 may send, at 632, an EAS information provisioning request to the registrar EES 610. The EAS information provisioning request may indicate the selected EAS instance (e.g., EAS 612) and one or more ACR scenarios. The EEC 604 may receive, at 632, an EAS information provisioning response that indicates registrar EES information on a condition that the selected EAS instance (e.g., EAS 612) and/or one or more selected ACR scenarios have been rejected. Additionally or alternatively, the EES 608 may send an EAS information request to a repository, for example, when the EAS information sharing configuration indicates that the EES 608 supports EAS information sharing with the repository. The EES 608 may receive an EAS information response from the repository. The EAS information response may include EAS information and registrar EES information for the EAS instances registered to other EES instances of the plurality of EES instances.

At 634, the AC 602 may establish a service session with the selected EAS instance (e.g., EAS 612).

Edge service provisioning with registrar EES information is disclosed herein. A WTRU may wish to discover edge services within an EDN without having to query each EES in the EDN. When supported by the EES, a WTRU may send a discovery request to one EES in the EDN to obtain EAS information and registrar EES information from one or more EES instances within the EDN. The WTRU may use the discovered EAS information and registrar EES information to select an EAS and to communicate with the registrar EES of the selected EAS for the selection and provisioning of ACR scenarios.

A solution solves the problem that EAS information is only available in the EES where the EAS is registered. The solution also solves the problem that an EES can only provide EAS information for EAS instances that are registered to the EES. An EES may perform the following actions for enabling discovery and selection of edge services within an EDN. The EES may send an EES registration request to an ECS; wherein the EES registration request may include EAS information sharing capabilities; wherein EAS information sharing capabilities may include an indication that the EES is capable of supporting EAS information sharing, a list of supported sharing methods, a list of EES instances to share EAS information with, a notification URL to receive EAS information sharing configuration updates, an address (e.g., IP address, URI, FQDN) and endpoint to receive EAS information updates, and an indication that the EES can be a repository for EAS information. The EES may receive an EES registration response with EAS information sharing configuration; wherein EAS information sharing configuration may include the selected sharing method, one or more repository address (e.g., IP address, URI, FQDN), and a list of EES instances to share registered EAS information with.

On a condition that the EAS information sharing configuration includes a repository, the EES may send an EAS information retrieve request to a repository; receive an EAS information retrieve response from the repository; wherein the EAS information retrieve response may include a list of EAS information, and registrar EES information for each EAS instance; wherein the registrar EES is the EES instance where an EAS is registered; wherein registrar EES information may include a unique EES identifier, an EES Profile, and any information specific to the registrar EES instance.

On a condition that an EAS registration is performed with the EES, the EES may send an EAS information update request to the repository; wherein the EAS information update request may include a list of EAS information for EAS instances registered to the EES; and receive an EAS information update response from the repository; wherein the EAS information update response may include a list of EAS information, and registrar EES information for each EAS instance.

On a condition that EAS information sharing configuration provides a list of EES instances to share EAS information with, and on the condition that an EAS information sharing configuration update notification is received with an updated list of EES instances to share EAS information with, or on the condition that an EAS registration is performed with the EES, the EES may send an EAS information update notification to one or more of the EES instances; wherein the EAS information notification may include a list of EAS information, and registrar EES information; wherein the registrar EES is the EES instance where an EAS is registered; wherein registrar EES information may include a unique EES identifier, an EES Profile, and any information specific to the registrar EES instance.

The EES may store EAS information received through EAS information sharing; wherein received EAS information may have been obtained by querying the repository, or may have been obtained from EAS information update notifications sent by other EES instances within the EDN. The EES may receive an EAS discovery request from the UE/EEC; wherein the EAS discovery request may include a list of one or more EES instances to obtain EAS information from and may include an indication that EAS information should be obtained from all EES instances in the EDN. The EES may send an EAS discovery response to the UE/EEC; wherein the EAS discovery response may include a list of EAS information and may include registrar EES information for each discovered EAS instance; wherein EAS information may have been obtained from EAS information sharing. The EES may receive an EAS information provisioning request from the WTRU; wherein the EAS information provisioning request includes the selected EAS and ACR scenario(s). The EES may evaluate the selected EAS and ACR scenario(s); wherein the evaluation may check if the selected EAS is registered to another EES, may validate that the selected ACR scenario(s) can be configured, and may verify if there is an EAS (e.g., preferred or required) that has already been configured for this WTRU. The EES may send an EAS information provisioning response to the WTRU; wherein the EAS information provisioning response may include an indication that the selected EAS and ACR scenarios have been accepted or rejected; wherein a rejection indication may include EAS instance information and registrar EES information for a different EAS instance; wherein the returned EAS instance may be required or preferred by the EES.

Figure 7:
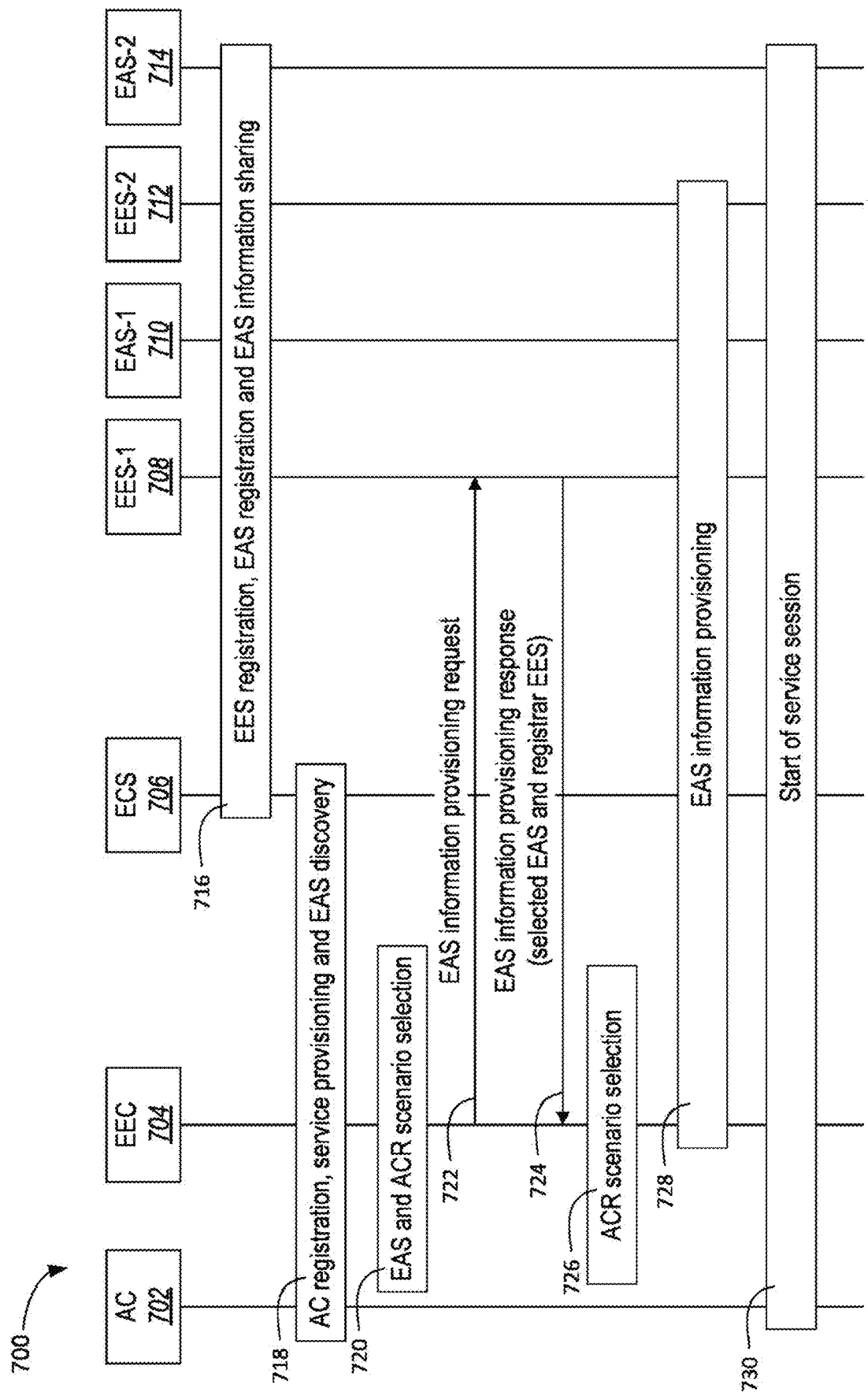
FIG. 7 is a flow diagram illustrating an example associated with edge service provisioning with registrar EES information.

FIG. 7 is a flow diagram illustrating an example associated with edge service provisioning 700 with registrar EES information. At 716, one or more EES instances (e.g., such as EES-1 708 and EES-2 712) within an EDN may register with an ECS 706. EES registration requests may include EAS information sharing capabilities of the EES instance(s) (e.g., such as EES-1 708 and EES-2 712). The ECS 706 may use the EAS information sharing capabilities to determine EAS information sharing configuration for each EES instance. One or more EAS instances (e.g., such as EAS-1 710 and EAS-2 714) may register to the EES instances (e.g., such as EES-1 708 and EES-2 712) and trigger EAS information sharing between the EES instances (e.g., such as EES-1 708 and EES-2 712) in the EDN.

Also, or alternatively, an AC 702 may register, at 718, with an EEC 704 and may request edge services. The EEC 704 may obtain EDN configuration information and EES information using service provisioning procedures. The EEC 704 may select an EES and may use the selected EES to discover EAS instances.

At 720, the EEC 704 may select an EAS and/or ACR scenario(s).

At 722, the EEC 704 may send an EAS information provisioning request to the selected EES (e.g., EES-1 708).

At 724, the EES 708 may send an EAS information provisioning response to the EEC 704. The EAS information provisioning response may include the EAS instance information and registrar EES information for a different (e.g., preferred or required) EAS instance. If the selected EAS instance is registered to a different EES, then the EEC 704 may use the registrar EES information to determine where the EAS information provisioning request should be sent.

At 726, the EEC 704 may re-select ACR scenarios according to the service continuity capabilities of the registrar EES. The EEC 704 may obtain the registrar EES profile from locally cached service provisioning results, or the EEC 704 may run service provisioning procedures again. ACR scenario selection may be re-evaluated using the registrar EES service continuity capabilities. The EEC 704 may need to register with the selected registrar EES if the registrar EES requires EEC registration.

At 728, the EEC 704 may perform edge service provisioning procedures (e.g., such as EAS information provisioning procedures) with the registrar EES (e.g., EES-2 712) of the selected EAS instance (e.g., EAS-2 714).

At 730, the AC 702 may establish a service session with the selected EAS instance (e.g., EAS-2 714).

Edge service discovery using an anchor EES is disclosed herein. A WTRU may wish to discover edge services within an EDN without having to query each EES in the EDN. When supported by the EES, a WTRU may select one EES to act as an anchor EES. The WTRU may communicate with the anchor EES to obtain EAS information from other EES instances within the EDN.

Figure 8:
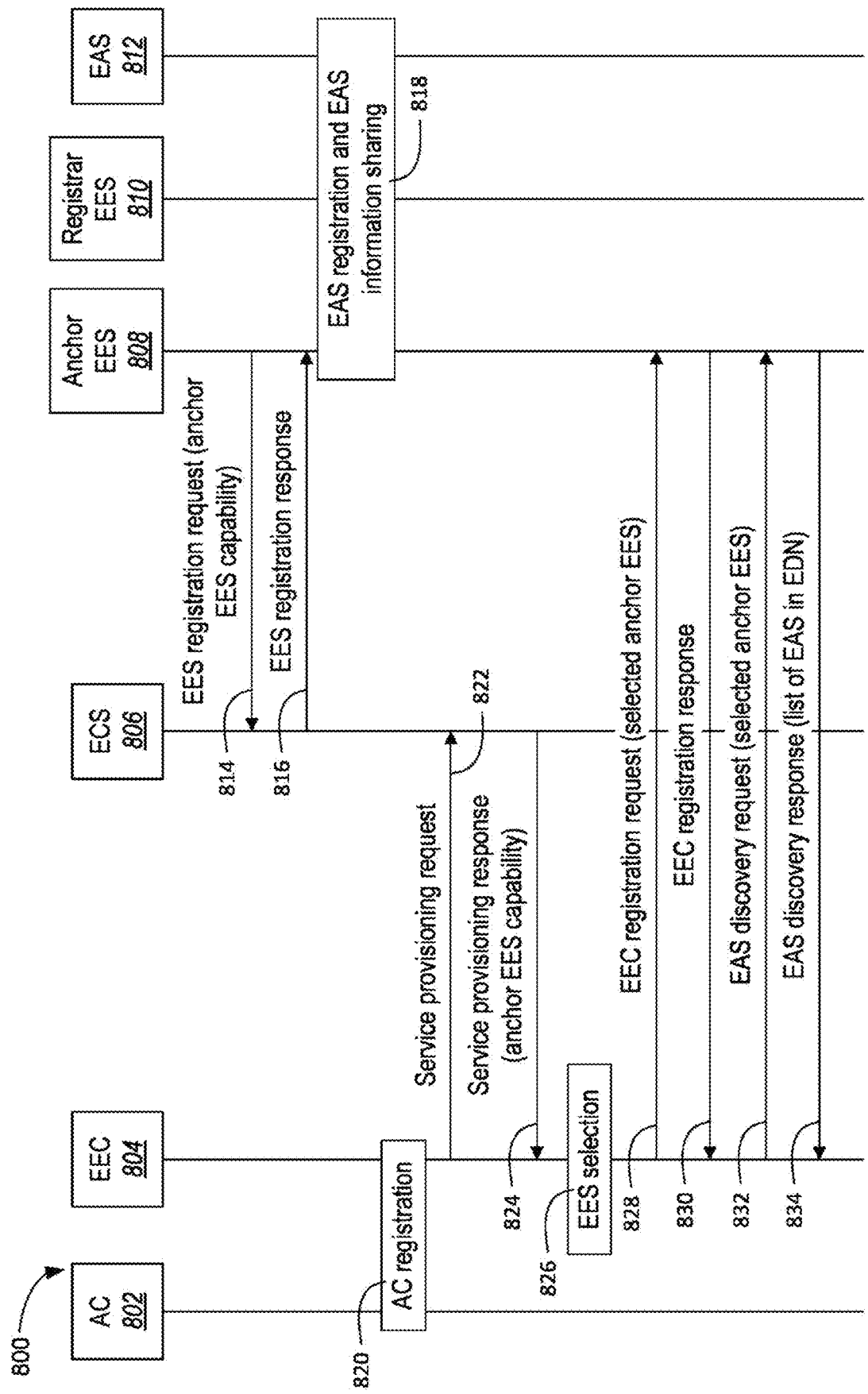
FIG. 8 is a flow diagram illustrating an example associated with edge service discovery using an anchor EES.

FIG. 8 is a flow diagram illustrating an example associated with edge service discovery 800 using an anchor EES. At 814, an EES (e.g., anchor EES 808) may send an EES registration request to the ECS 806. The EES registration request may include anchor EES capabilities. Anchor EES capabilities may include an indication that the EES (e.g., anchor EES 808) supports anchor EES functions.

At 816, the ECS 806 may send an EES registration response to the EES (e.g., anchor EES 808).

At 818, an EAS 812 may register to one of the EES instances (e.g., the registrar EES 810). The registrar EES 810 may share the registered EAS information with other EES instances within the same EDN.

At 820, the AC 802 may register with the EEC 804 and may request edge services. At 822, the EEC 804 may send a service provisioning request to the ECS 806.

At 824, the ECS 806 may send a service provisioning response to the EEC 804. The service provisioning response may include anchor EES capabilities of the EES instances.

For example, anchor EES capabilities may inform the EEC 804 about which EES instances may be used as an anchor EES within an EDN.

At 826, the EEC 804 may select an EES to use for edge service discovery. The EEC 804 may consider the anchor EES capabilities of the EES instances while making a selection.

For example, the EEC 804 may select an EES instance that supports the anchor EES functionality.

At 828, the EEC 804 may send an EEC registration request to the selected EES (e.g., anchor EES 808). The EEC registration request may include an indication that the EES (e.g., anchor EES 808) has been selected as an anchor EES for the requesting EEC 804.

At 830, the selected EES (e.g., anchor EES 808) may send an EEC registration response to the EEC 804. The EEC registration response may include an indication that the EES (e.g., anchor EES 808) accepts to be the anchor EES for the requesting EEC 804. The anchor EES 808 may create and maintain an EEC context and EAS mapping to properly handle future requests from the EEC 804.

At 832, the EEC 804 may send an EAS discovery request to the anchor EES 808. The EAS discovery request may include an indication that the EES (e.g., anchor EES 808) has been selected as an anchor EES for the requesting EEC 804. The indication that the EES (e.g., anchor EES 808) has been selected as an anchor EES may be omitted if the EEC 804 has already provided this indication during EEC registration.

At 834, the anchor EES 808 may send an EAS discovery response to the EEC 804. The EAS discovery response may include a list of EAS instance information obtained from all EES instances in the EDN.

For example, an anchor EES (e.g., anchor EES 808) may return discovered EAS instances obtained from EAS information sharing.

A solution solves the problem that an EES can only provide EAS information for EAS instances that are registered to the EES. The solution also solves the problem that when an EES is allowed to provide EAS information for EAS instances that are registered to other EES instances, the WTRU may provision the selected EAS and ACR scenarios in an EES where the selected EAS is not registered, which may lead to service continuity failures. This solution enables an EES to correctly handle service continuity provisioning for an EAS registered to another EES.

An EES may perform the following actions for enabling discovery and selection of edge services within an EDN. The EES may send an EES registration request to an ECS; wherein the EES registration request may include an indication that the EES is capable of performing anchor EES functions; wherein an anchor EES is an EES instance that may be used by a WTRU as a gateway to perform edge service discovery, selection and provisioning procedures within an EDN.

The EES may receive an EEC registration request from a WTRU; wherein the EEC registration request may include an indication that the EES has been selected as an anchor EES.

The EES may send an EEC registration response to the WTRU; wherein the EEC registration response may include an indication that the EES accepts to be the anchor EES for the WTRU.

The EES may receive an EAS discovery request from a WTRU; wherein the EAS discovery request may include an indication that the EES has been selected as an anchor EES.

The EES may send an EAS discovery response to the WTRU; wherein the EAS discovery response may include an indication that the EES accepts to be the anchor EES for the WTRU and may include a list of EAS information obtained from one or more EES instances within the EDN.

On the condition that an anchor EES receives an EAS information provisioning request from the WTRU, and on the condition that the selected EAS provided in the EAS information provisioning request is registered to another EES instance, an anchor EES may send an EAS proxy setup request to the registrar EES; wherein the registrar EES is the EES instance where an EAS is registered; wherein the EAS proxy establishment request may include EAS proxy configuration information; wherein EAS proxy configuration information may include the selected EAS profile, and the anchor EES address (e.g., IP address, URI, FQDN) and endpoint, may receive an EAS proxy setup response from the registrar EES; wherein the EAS proxy establishment response may include an indication that the EAS proxy has been successfully established and configured, and may send an EAS proxy request to the EAS proxy in the registrar EES; wherein the EAS proxy request may include the message to be sent to the selected EAS; wherein the message may be an ACR management event notification of type "ACR selection."

Edge service selection and provisioning using an anchor EES are disclosed herein. After discovering edge services within an EDN, a WTRU may select an EAS and may select and provision ACR scenarios using an anchor EES. The anchor EES may determine that the selected EAS is registered to a different EES and may use the registrar EES as a proxy to communicate with the selected EAS.

Figure 9:
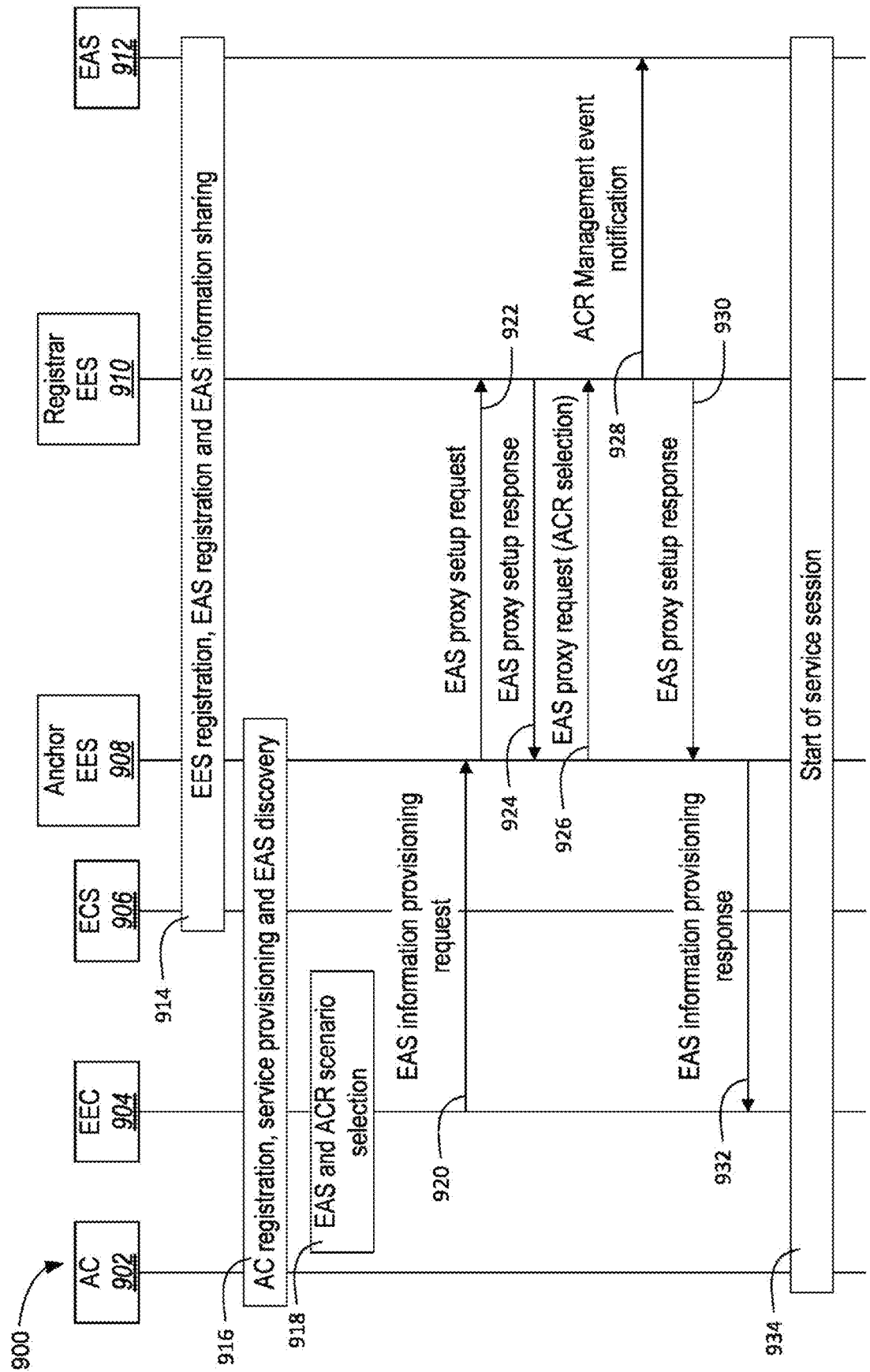
FIG. 9 is a flow diagram illustrating an example associated with edge service selection and provisioning using an anchor EES.

FIG. 9 is a flow diagram illustrating an example associated with edge service selection and provisioning 900 using an anchor EES. At 914, EES instances within an EDN may register with an ECS 906. EES registration requests may include anchor EES capabilities of the EES instances. An EAS 912 may register to one of the EES instances (e.g., the registrar EES 910). The registrar EES 910 may share the registered EAS information with other EES instances within the same EDN.

Also, or as an alternative, an AC 902 may register, at 916, with an EEC 904 and may request edge services. The EEC 904 may obtain EDN configuration information and EES information using service provisioning procedures. The EEC 904 may select an anchor EES 908 and may use the anchor EES 908 to discover EAS instances.

Also, or as an alternative, the EEC 904 may select, at 918, an EAS instance and/or ACR scenario(s) for provisioning. The EEC 904 may consider the service continuity capabilities of the anchor EES 908 while selecting ACR scenario(s).

At 920, the EEC 904 may send an EAS information provisioning request to the anchor EES 908.

The anchor EES 908 may use EAS information and registrar EES information obtained from EAS information sharing to verify if the selected EAS (e.g., EAS 912) is registered to another EES instance. If the selected EAS instance is registered to a different EES instance, the anchor EES 908 may send, at 922, an EAS proxy setup request to the registrar EES 910 of the selected EAS to establish and configure an EAS proxy. The EAS proxy setup request may include EAS proxy configuration information. EAS proxy configuration information may include the selected EAS profile, and the anchor EES address (e.g., IP address, URI, FQDN), and/or the endpoint for handling requests proxied from the EAS 912.

For example, the registrar EES 910 may have published to an EES repository the EAS information of EAS instances registered to the registrar EES 910. The anchor EES 908 may have obtained EAS information and registrar EES information from the EES repository. The anchor EES 908 may use this information to determine that the selected EAS (e.g., EAS 912) is not registered to the anchor EES 908 and to trigger the establishment of an EAS proxy at the registrar EES 910.

At 924, the registrar EES 910 may send an EAS proxy setup response to the anchor EES 908. The EAS proxy setup response may indicate if the EAS proxy has successfully been established and configured.

At 926, the anchor EES 908 may send an EAS proxy request to the EAS proxy in the registrar EES 910. The EAS proxy request may include the message to be sent to the selected EAS (e.g., EAS 912).

For example, during EAS and ACR scenario information provisioning, the anchor EES 908 may indicate that an "ACR selection" ACR management event notification should be sent to the selected EAS (e.g., EAS 912).

The EAS proxy in the registrar EES 910 may send the requested message to the EAS 912.

For example, the EAS proxy in the registrar EES 910 may send, at 928, an ACR management event notification to the selected EAS (e.g., EAS 912) to provide the ACR selection information to the EAS 912.

The EAS proxy in the registrar EES 910 may send, at 930, an EAS proxy response to the anchor EES 908. The EAS proxy response may indicate if the request has successfully been processed by the EAS proxy.

The anchor EES 908 may send, at 932, an EAS information provisioning response to the EEC 904. The EAS information provisioning response may include an indication that the selected EAS (e.g., EAS 912) and ACR scenario(s) have been accepted.

At 934, the AC 902 may establish a service session with the selected EAS instance (e.g., EAS 912).

The following abbreviations and acronyms have been included.
  Application Client (AC);
  Application Context Relocation (ACR);
  Data Network (DN);
  Data Network Name (DNN);
  Edge Application Server (EAS);
  Edge Configuration Server (ECS);

Edge Data Network (EDN);
Edge Enabler Client (EEC);
Edge Enablement Layer (EEL);
Edge Enabler Server (EES);
Fully Qualified Domain Name (FQDN);
Key Performance Indicator (KPI);
Notification Management Client (NMC);
Notification Management Server (NMS);
Quality of Service (QOS);
Source Edge Application Server (S-EAS);
Source Edge Enabler Server (S-EES);
Technical Specification (TS);
Target Edge Application Server (T-EAS);
Target Edge Enabler Server (T-EES); and
Universal Resource Identifier (URI).

What is claimed is:

1. A wireless transmit/receive unit (WTRU) comprising:
a processor configured to:
send a discovery request to a first edge enabled server (EES) to obtain edge application server (EAS) information;
receive a discovery response from the first EES, wherein the discovery response comprises a list of discovered EASs, wherein the list comprises EAS information for each of the discovered EASs in the list, and wherein the EAS information for a discovered EAS comprises registrar EES information based on the discovered EAS being registered to a second EES, and wherein the EAS information for the discovered EAS further comprises an EAS profile on a condition that the discovered EAS is instantiated; and
select an EAS from the list of discovered EASs.

2. The WTRU of claim 1, wherein the processor is further configured to send an EAS information provisioning request, wherein the EAS information provisioning request indicates the selected EAS and one or more application context relocation (ACR) scenarios.

3. The WTRU of claim 2, wherein the processor is further configured to receive an EAS information provisioning response from the second EES.

4. The WTRU of claim 1, wherein the discovery response indicates ACR scenarios supported by one or more EASs in the list of EAS information.

5. The WTRU of claim 1, wherein the discovery request comprises an indication that EAS information is requested from a plurality of EESs.

6. The WTRU of claim 1, wherein the selected EAS is selected based on the EAS information.

7. The WTRU of claim 1, wherein the selected EAS is registered to a third EES that is different than the first EES.

8. The WTRU of claim 1, wherein the discovery request is sent on a condition that the EAS information sharing capability of the first EES indicates that the first EES is capable of obtaining EAS information from other EESs within an edge data network (EDN).

9. The WTRU of claim 1, wherein the processor is further configured to select one or more ACR scenarios based on one or more of the list of EAS information or the registrar EES information for each discovered EAS.

10. The WTRU of claim 9, wherein the processor is further configured to obtain a registrar EES profile using the registrar EES information; wherein the registrar EES profile is obtained from a local cache, from the discovery response, or by performing service provisioning procedures with an edge configuration server (ECS), and wherein the one or more selected ACR scenarios are selected according to the EAS information and registrar EES information and profile.

11. A method performed by a wireless transmit/receive unit (WTRU), the method comprising:
sending a discovery request to a first edge enabled server (EES) to obtain edge application server (EAS) information;
receiving a discovery response from the first EES, wherein the discovery response comprises a list of discovered EASs, wherein the list comprises EAS information for each of the discovered EASs in the list, and wherein the EAS information for a discovered EAS comprises registrar EES information based on the discovered EAS being registered to a second EES, and wherein the EAS information for the discovered EAS further comprises an EAS profile on a condition that the discovered EAS is instantiated; and
selecting an EAS from the list of discovered EASs.

12. The method of claim 11, further comprising sending an EAS information provisioning request, wherein the EAS information provisioning request indicates the selected EAS and one or more application context relocation (ACR) scenarios.

13. The method of claim 12, further comprising receiving an EAS information provisioning response from the second EES.

14. The method of claim 11, wherein the discovery response indicates ACR scenarios supported by one or more EASs in the list of EAS information.

15. The method of claim 11, wherein the discovery request comprises an indication that EAS information is requested from a plurality of EESs.

16. The method of claim 11, wherein the selected EAS is selected based on the EAS information.

17. The method of claim 11, wherein the selected EAS is registered to a third EES that is different than the first EES.

18. The method of claim 11, wherein the discovery request is sent on a condition that the EAS information sharing capability of the first EES indicates that the first EES is capable of obtaining EAS information from other EESs within an edge data network (EDN).

19. The method of claim 11, further comprising selecting one or more ACR scenarios based on one or more of the list of EAS information or the registrar EES information for each discovered EAS.

20. The method of claim 19, further comprising obtaining a registrar EES profile using the registrar EES information; wherein the registrar EES profile is obtained from a local cache, from the discovery response, or by performing service provisioning procedures with an edge configuration server (ECS), and wherein the one or more selected ACR scenarios are selected according to the EAS information and registrar EES information and profile.

* * * * *